(12) United States Patent
Willis et al.

(10) Patent No.: US 7,519,266 B1
(45) Date of Patent: Apr. 14, 2009

(54) ELIMINATING PICTURE FORMAT ARTIFACTS IN MPEG TRICK MODES

(75) Inventors: Donald Henry Willis, Indianapolis, IN (US); Shu Lin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1114 days.

(21) Appl. No.: 10/129,902

(22) PCT Filed: Nov. 10, 2000

(86) PCT No.: PCT/US00/30724

§ 371 (c)(1),
(2), (4) Date: Oct. 3, 2002

(87) PCT Pub. No.: WO01/35651

PCT Pub. Date: May 17, 2001

Related U.S. Application Data

(60) Provisional application No. 60/164,791, filed on Nov. 10, 1999.

(51) Int. Cl.
*H04N 5/91* (2006.01)
(52) U.S. Cl. .................................. 386/68
(58) Field of Classification Search .......... 386/68, 386/111, 125–126, 45, 46
See application file for complete search history.

(56) References Cited

U.S. PATENT DOCUMENTS

| | | | |
|---|---|---|---|
| 5,485,280 A * | 1/1996 | Fujinami et al. | 386/123 |
| 5,592,299 A * | 1/1997 | Boyce et al. | 386/68 |
| 5,661,525 A * | 8/1997 | Kovacevic et al. | 348/452 |
| 5,867,625 A | 2/1999 | McLaren | 386/68 |
| 6,377,628 B1 * | 4/2002 | Schultz et al. | 375/240.26 |
| 6,542,196 B1 * | 4/2003 | Watkins | 348/448 |
| 6,574,423 B1 * | 6/2003 | Oshima et al. | 386/111 |

* cited by examiner

*Primary Examiner*—Thai Tran
*Assistant Examiner*—Tat Chi Chio
(74) *Attorney, Agent, or Firm*—Robert D. Shedd; Robert B. Levy; Jorge Tony Villabon

(57) ABSTRACT

A method and apparatus for eliminating picture artifacts in a video media system is provided wherein a video recorder, responsive to a trick mode command, iteratively transmits one or more frames in a video signal recorded under an interlaced scanning format for display on a display device. The video signal can include a predetermined number of replicate frames associated with the frames. Moreover, structure can be provided for selectively altering the video signal to indicate the video signal was recorded under a progressive scanning format thereby causing one or more pairs of the interlaced fields associated with the frames in the recorded video signal to be simultaneously displayed on the display device. Displaying interlaced fields simultaneously during trick mode playback eliminates an artifact known as the vibration effect. In one embodiment, the structure can alter the video signal by setting the value of one or more flags in the video signal. In addition, a decoder for decoding the video signal can be remotely located, for example, in the display device, or can be mounted in the video recorder.

24 Claims, 4 Drawing Sheets

ELIMINATING PICTURE FORMAT ARTIFACTS IN MPEG TRICK MODES

This application claims the benefit under 35 U.S.C. § 365 of International Application PCT/US00/30724, filed Nov. 10, 2000, which was published in accordance with PCT Article 21(2) on May 17, 2001 in English; and which claims benefit of U.S. provisional application Ser. No. 60/164,791 filed Nov. 10, 1999.

BACKGROUND OF THE INVENTION

1. Technical Field

The inventive arrangements relate generally to methods and apparatus providing advanced operating features for video only and both video and audio programs recorded on disk media, for example recordable digital video disks, hard drives and magneto optical disks.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

A DVD recorder has the capability to record video onto a disc medium and playback the video at different speeds. For example, a DVD recorder can playback video at fast-forward or slow-motion speed. In addition, a DVD recorder can pause the video to display a single image from the recorded video. These playback variations are commonly referred to as trick modes. Typically, a DVD recorder performs these trick modes by repeating one or more pictures contained in the recorded video. For example, a DVD recorder can repeat every picture from a particular portion of recorded video to give the viewer the impression that the video is being displayed at one-half its normal speed. In the fast-forward trick mode, the DVD recorder can repeat one or more pictures from the video and then skip a plurality of pictures before repeating the next set of pictures. If the video is paused, the DVD recorder can continuously repeat the same picture that was last displayed when the pause command was received.

A DVD recorder can play recorded video on televisions that use either an interlaced scanning format or a progressive scanning format. Under the interlaced scanning format, the video picture signal is typically divided into 525 horizontal lines. During each field period, however, only one-half of these lines are scanned; the odd-numbered lines are scanned first, and the even-numbered lines are scanned thereafter. Each sweep is referred to as a field, and when combined, the two fields form a complete picture or frame. For an NTSC system, sixty fields are displayed per second, resulting in a rate of thirty frames per second.

Under the progressive scanning format, each of the horizontal lines of the video picture signal is scanned during each picture sweep. Thus, the entire picture is displayed after a particular picture sweep. Although the scanning rate in a progressive scanning format must be doubled as compared to the rate in an interlaced format, progressive scanning produces a superior picture. As a result, the progressive scanning format has been adopted in a number of high performance media devices such as computer monitors and some high-definition televisions (HDTV).

In certain DVD recording systems, it may be desirable to decode the outgoing video signal, typically an MPEG formatted signal, at a location external to the DVD recorder. For example, in a number of these systems, the MPEG decoder is located in the television on which the recorded video is being played back. Bypassing the decoding system of the DVD recorder is typically done if the viewer wishes to playback video on an ATSC television such as HDTV. HDTV televisions require high bit rates and as a result, must have decoders that can decode complex video signals. These decoders can be expensive and generally are not included in many of today's recordable DVD devices. Accordingly, many manufacturers of HDTV televisions implement into their HDTV televisions MPEG decoders capable of decoding high bit rate MPEG signals.

Under this arrangement, however, artifacts may appear in the video display of the HDTV television during trick mode playback of video recorded under an interlaced format. This problem is prevalent in HDTV televisions that can perform either progressive scanning, interlaced scanning or a combination thereof. One example of such an artifact is a vibration effect that is produced when video containing a moving object is recorded and played back under trick mode on such a television.

As a moving object moves across the screen in an interlaced scan television, each field will only display a portion of the moving object. This is because a field only displays every other horizontal line of the overall picture. For example, for a particular field n, only the odd-numbered horizontal lines are scanned and the portion of the moving object that will be displayed in field n is the portion that is scanned during the odd-numbered horizontal line sweep for field n. The next field, field n+1, is created 1/60 of a second later and will display the even-numbered horizontal lines of the picture. Thus, the portion of the moving object that is displayed in field n+1 is the portion that is scanned during the even-numbered horizontal line sweep for field n+1. Although each field is temporally distinct, the human eye perceives the sequential display of the fields as smooth motion due to the speed at which the fields are displayed.

As a DVD recorder records video being displayed in the interlaced format, each frame is recorded onto a particular disc medium. During playback, these frames can be sent to the remotely located television for decoding and display. Since progressive scan televisions are designed to display complete frames, these televisions are typically equipped with a deinterlacer. When complete frames are sent to the television, the frames are decoded and the interlaced fields that constitute the complete frames are separated. Once these fields are separated, the television instructs its deinterlacer to deinterlace each field. Deinterlacing each interlaced field comprising the frames results in an overall higher picture quality.

If the viewer activates any of the trick modes, the video signal sent from the DVD recorder to the progressive scan television will contain repeated frames from the video recorded under the interlaced format. As an example, if the viewer pauses the video to display a single frame, the DVD recorder will continuously send the same frame for display on the progressive scan television. Subsequently, the fields that constitute the particular frame being repeated are deinterlaced to form two separate frames. Accordingly, the progressive scan television will alternately display the frames created by the deinterlacing process.

As noted earlier, if a moving object appears in the video recorded under the interlaced format, each field will only display a portion of the moving object. Thus, as the frames constructed from the deinterlaced fields are alternately displayed in a repeated fashion, the moving objects in the display appear to vibrate during the trick mode. This is because the frames created by deinterlacing each interlaced field are temporally distinct, and the moving object appears in a different position for each frame. As the television alternately displays these two frames repeatedly during the trick mode, the moving object appears to vibrate resulting in an unwanted artifact.

This vibration effect appears in the fast-forward and slow-motion trick modes as well. In fact, any playback process that utilizes repeating pictures that contain moving objects produces this artifact. Moreover, this artifact is not limited to televisions that only employ the progressive scanning format; ATSC televisions that have the capability to display either interlaced or progressive signals, such as an HDTV that displays a 1080 line interlaced signal, also suffer from this drawback. As a result, it is desirable to eliminate this artifact without any significant change in the hardware of the DVD recorder system and without any increase in costs.

SUMMARY OF THE INVENTION

The invention features a method for eliminating picture artifacts in a video media device. In one arrangement, the method includes the steps of: in response to a trick mode command, iteratively transmitting one or more frames in a video signal recorded under an interlaced scanning format, the video signal including a predetermined number of replicate frames associated with the one or more frames; and selectively altering the video signal to indicate said video signal was recorded under a progressive scanning format.

In another aspect of the above method, altering the video signal can be performed by setting the value of one or more flags in the video signal. Moreover, an MPEG format can be used to create the video signal wherein the video signal includes an MPEG video bit stream. In another variation of the above method, the one or more flags that are set in the altering step is a progressive frame flag of the MPEG video bit stream. In addition, the progressive frame flag can include one or more bits wherein the one or more bits can be set in the altering step to indicate that the video signal was created under a progressive scanning format. In another variation, the one or more bits can be a single bit wherein the single bit can be set to a high value in the altering step.

In an alternative embodiment, an MPEG decoder for decoding the MPEG video bit stream can be mounted in the video media device. Alternatively, the MPEG decoder for decoding the MPEG video bit stream can be remotely located. In a variation of the remotely located MPEG decoder arrangement, the MPEG decoder can be mounted in a display device.

In another arrangement, the altering step can cause one or more pairs of interlaced fields associated with the frames and the replicate frames to be simultaneously displayed on a display device. In another aspect, the display device uses a progressive scanning format to display the video image. Alternatively, the display device can be capable of using a progressive scanning format or an interlaced scanning format to display the video image.

In another aspect, the invention also features a video media system for eliminating picture artifacts. In one arrangement, the video media system includes: a video recorder responsive to a trick mode command for iteratively transmitting one or more frames in a video signal recorded under an interlaced scanning format, the video signal including a predetermined number of replicate frames associated with said one or more frames; and structure for selectively altering the video signal to indicate the video signal was recorded under a progressive scanning format.

In the above video media system, the structure can alter the video signal by setting the value of one or more flags in the recorded video signal. In addition, the video recorder can use an MPEG format to create the video signal wherein the video signal can include an MPEG video bit stream. In another variation of the above system, the one or more flags that are set by the structure is a progressive frame flag of the MPEG video bit stream. Moreover, the progressive frame flag can include one or more bits wherein the one or more bits can be set by the structure to indicate that the video signal was created under a progressive scanning format. In another variation, the one or more bits can be a single bit wherein the single bit is set by the structure to a high value.

In an alternative embodiment, an MPEG decoder for decoding the MPEG video bit stream can be mounted in the video recorder. Alternatively, the MPEG decoder for decoding the MPEG video bit stream can be remotely located. In a variation of the remotely located MPEG decoder arrangement, the MPEG decoder can be mounted in a display device.

In another variation of the above video media system, the structure can cause one or more pairs of interlaced fields associated with said frames and said replicate frames to be simultaneously displayed on a display device. In another arrangement, the display device uses a progressive scanning format to display the video image. Alternatively, the display device can be capable of using a progressive scanning format or an interlaced scanning format to display the video image.

DETAILED DESCRIPTION OF THE PREFERRED EMBODIMENTS

Recordable DVD Device

Figure 1:
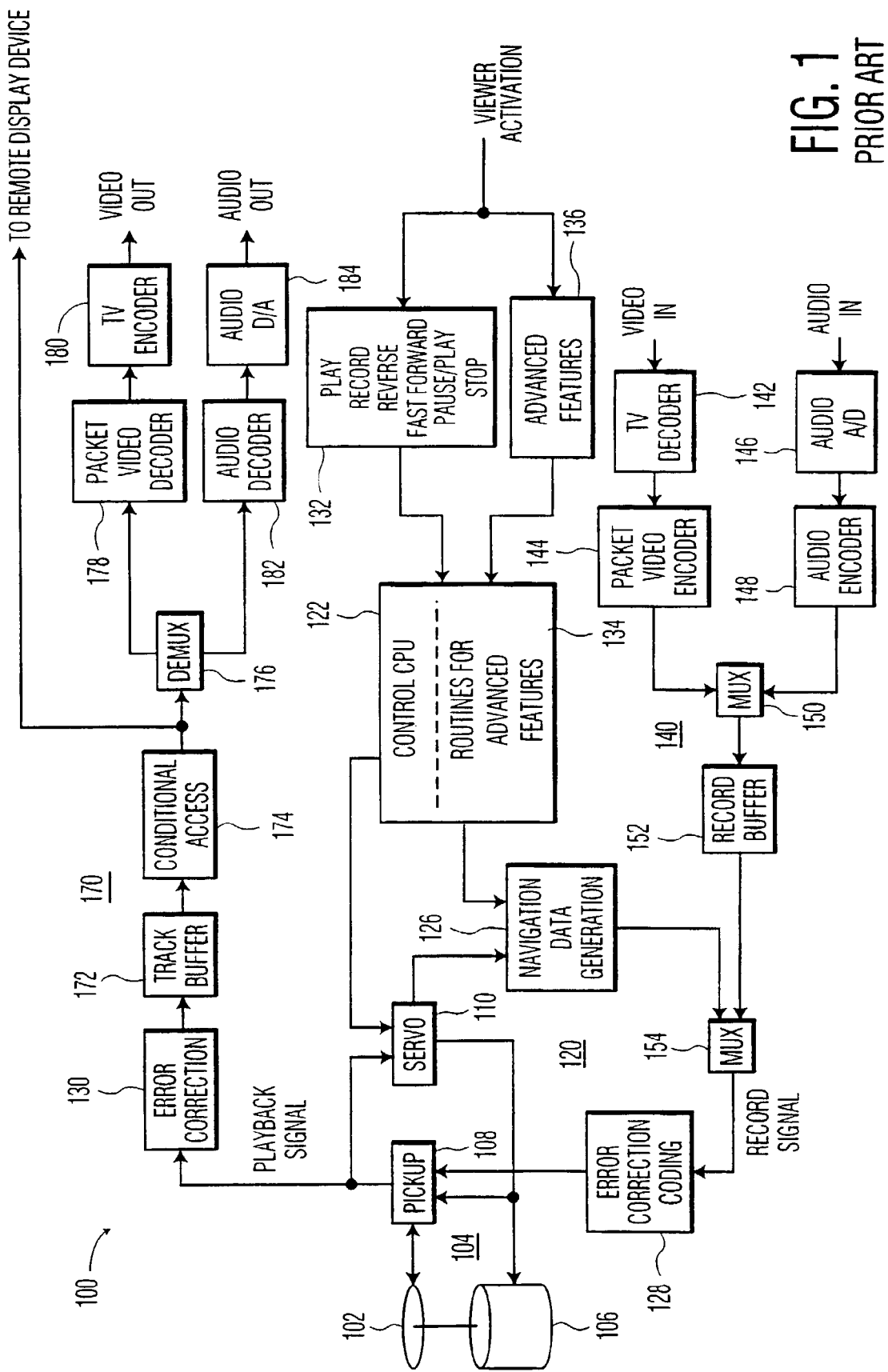
FIG. 1 is a block diagram of a rewritable DVD device that can be provided with one or more advance operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. Although FIG. 1 illustrates a recordable DVD device, it is understood that the invention can be practiced with any video recording device that outputs a digital video signal. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly 108 burns spots onto a spiral track on the disc 102 or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140.

The output of the MUX 154 is an input to an error correction coding circuit 128. The output of the error correction coding circuit 128 is a recordable input signal supplied to the pickup 108, which will be "burned" onto the spiral track of the disc 102 by the laser.

The control CPU 122 also preferably has access to the data contained in the track buffer 172 and record buffer 152 as shown in FIG. 1. CPU 122 can delete, modify, and reformat video data stored in the track buffer 172 and record buffer 152. Control and data interfaces are also preferably provided for permitting CPU 122 to control the operation of video encoder 144 and audio encoder 148. Suitable software or firmware is provided in memory for the conventional operations performed by control CPU 122.

A control buffer 132 for viewer activatable functions indicates those functions presently available, namely play, record, reverse, fast forward, slow play, pause/play and stop. In addition, a separate buffer 136 is provided to receive commands for a special pause feature that can be implemented into the device 100.

The video/audio input processing path 140 is a signal processing circuit for converting conventional television signals, for example NTSC or PAL, into digitized packet data, for example MPEG-1 or MPEG-2, for digital recording by the device 100. The input path 140 can comprise an NTSC decoder 142 and video encoder, for example MPEG-1 or MPEG-2, 144 for video in, and can include an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As groups of audio and video data packets are created, they are combined in MUX 154 with appropriate navigation packets generated in the navigation data generation block 126. The packets are then sent on to the error correction coding circuit 128. Error correction coding circuit 128 can also be deemed to be part of the input path 140.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing. In addition, the conditional access circuit 174 can also decrypt the data read from the disc, as it is well known that such data is typically encrypted for purposes of copyright protection.

The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. In accordance with the inventive arrangements herein, the device 100 can be adapted to bypass its own decoding system and direct the video signal from the output processing path 170 to a remotely located display device. Under such an arrangement, the video signal from the device 100 can be decoded by a decoding system mounted in the display device. Bypassing the decoding system of the device 100 is typically done if the viewer wishes to playback video on an ATSC television such as an HDTV.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

Eliminating Picture Format Artifacts in MPEG Trick Modes

According to the inventive arrangements, picture format artifacts in trick modes can be eliminated by modifying the MPEG video bitstream provided to an external video decoder associated with a display device. This alteration can prevent the deinterlacer from splitting the incoming interlaced frame (s) into their respective fields. This process enables the interlaced fields to be displayed simultaneously. Simultaneous display of interlaced fields can eliminate the vibration effect that is associated with trick mode playback.

Figure 2:
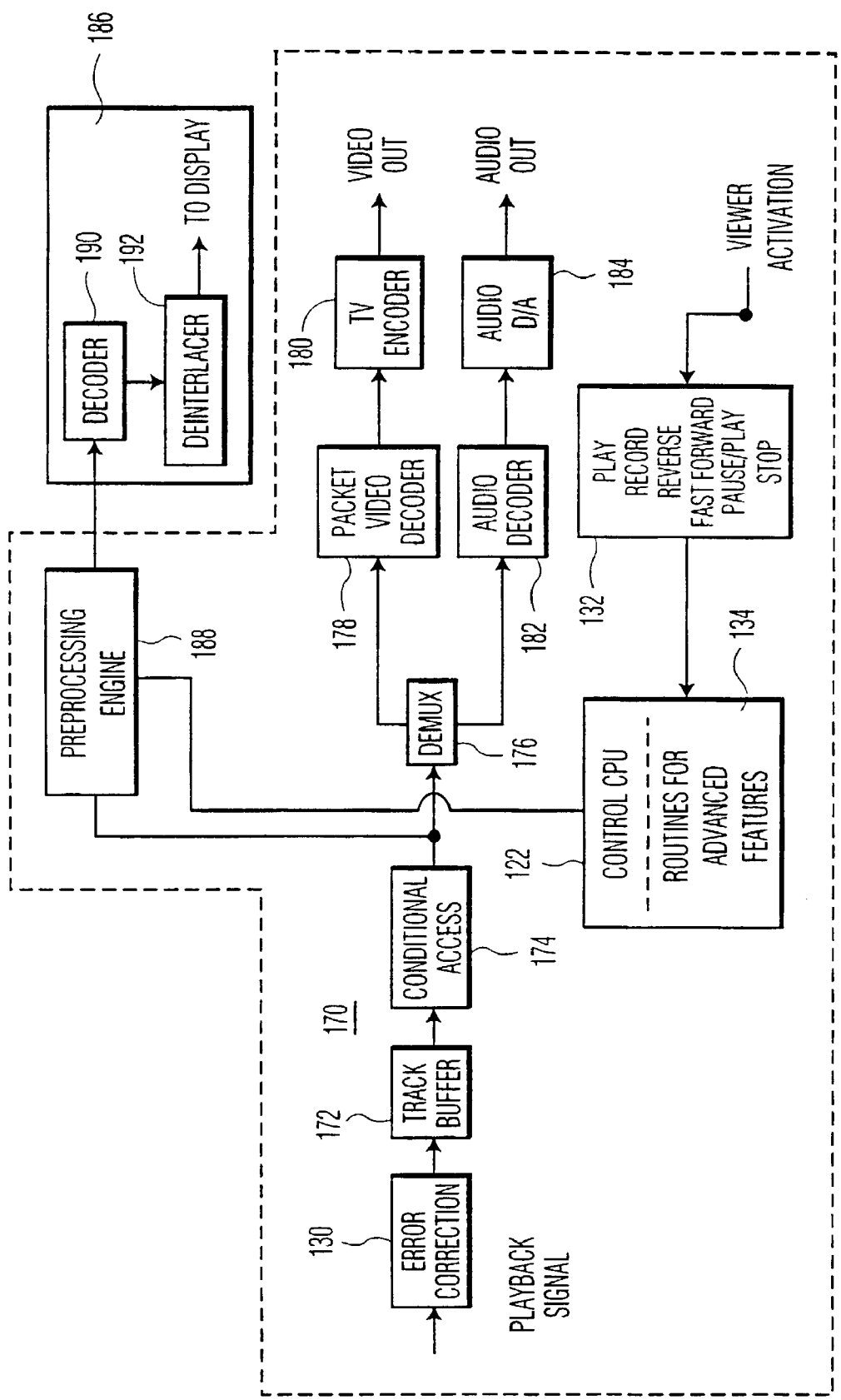
FIG. 2 is a block diagram illustrating the diversion of a recorded video signal to a display device for decoding and eventual display in accordance with the inventive arrangements.

FIG. 2 illustrates one way how the device 100 can be modified to alter the video signal being transmitted to a remote display device 186. In this particular arrangement, the MPEG video signal can be diverted from the output processing path 170 to a preprocessing engine 188. If the control CPU 122 receives a trick mode command, the control CPU 122 can instruct the preprocessing engine 188 to alter the MPEG video signal. This video signal can contain one or more frames that are being repeated for purposes of trick mode playback. For easier modification of the MPEG video signal by the preprocessing engine 188, the signal is preferably diverted after it is decrypted by the conditional access circuit 174. It is understood, however, that the invention is not limited in this regard as the device 100 can be adapted to divert the MPEG video signal from anywhere along the output processing path 170.

Once modified, the video signal can be sent to a decoder 190 located in the display device 186. Due to the alteration of the video signal, the decoder 190 interprets the video signal as a signal that contains progressively scanned pictures. Accordingly, the decoder 190 signals the deinterlacer 192 to suspend the deinterlacing process which causes the fields of each particular frame being repeated to be displayed at the same time.

In an alternative embodiment, the video signal can be reencrypted before being sent to the display device 186. This reencryption step can be performed to prevent illegal copying of copyrighted data as it is transferred to the display device 186. Reencryption of the video signal, however, does not affect the overall performance of the invention as the decoder system will still interpret the video signal as a progressive scan signal.

Figure 3:
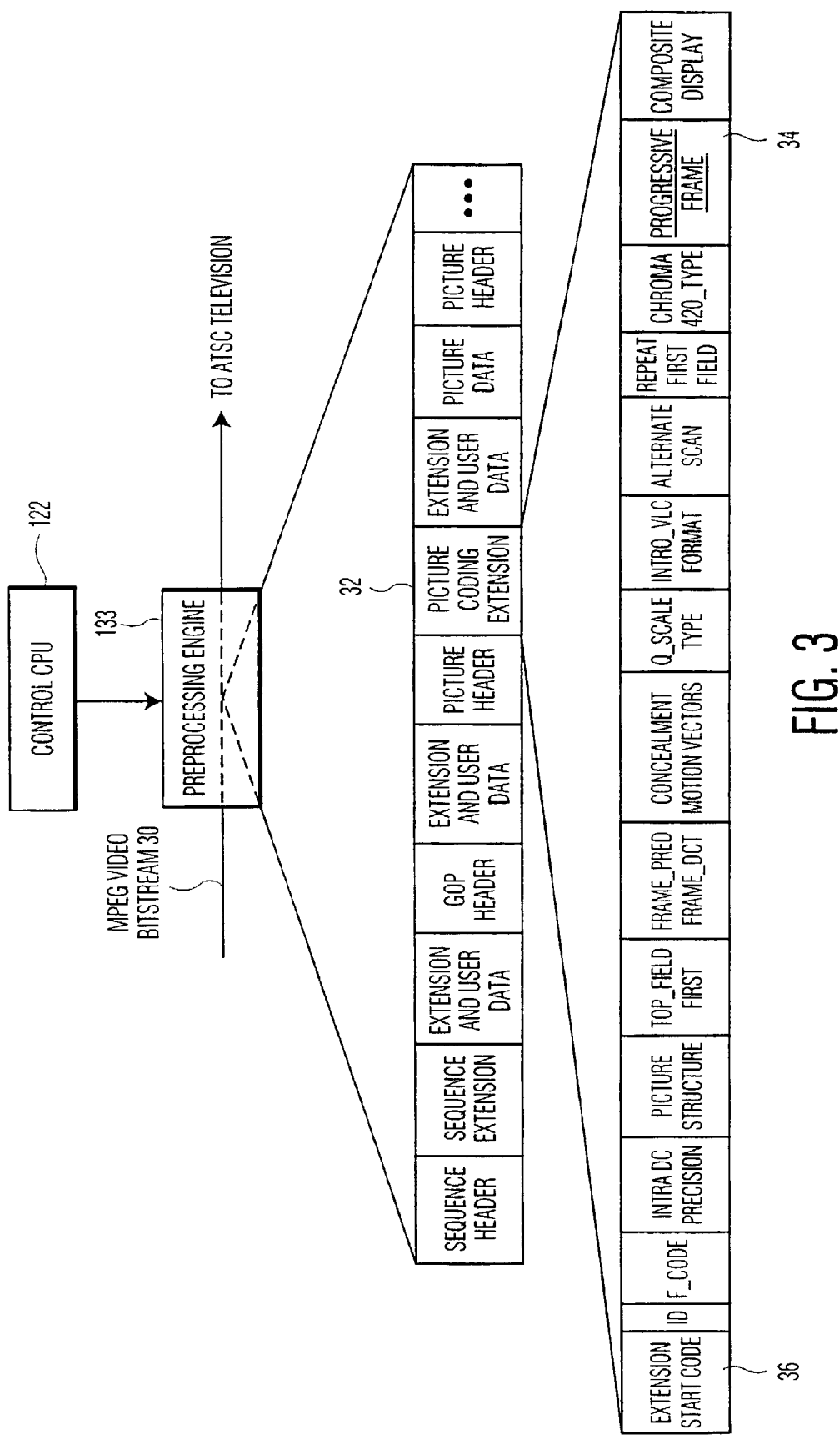
FIG. 3 illustrates how a typical MPEG video bitstream can be altered in accordance with the inventive arrangements.

For increased capacity and for compatibility purposes, the device 100 preferably uses a video signal in accordance with the MPEG-2 standard; however, it is understood that other types of video encoding standards may be used to practice this invention. FIG. 3 illustrates one way how an MPEG video signal can be altered to eliminate the vibration effect during trick mode playback. MPEG video bitstream 30 represents a typical MPEG bitstream that can be used in the present invention. Included in the bitstream 30 are a number of syntax headers. These syntax headers can contain information about the recorded video such as picture size, aspect ratio, bit rate and chroma format. One of these headers, a picture coding extension header 32, can contain information that enables an MPEG decoder to properly decode the MPEG video bitstream 30. As is well known in the art, each picture, or frame, in the MPEG video bitstream 30 can include a picture coding extension header 32. In addition, it is also known that if the fields in the MPEG bitstream 30 are not combined, then each individual field can include a picture coding extension header 32.

FIG. 3 also illustrates an expanded view of the extension header 32. One of the flags included in the picture coding extension header 32 is a progressive frame flag 34. The progressive frame flag 34 can indicate whether a particular MPEG frame was created under an interlaced scanning format or a progressive format. Typically, the progressive frame flag 34 contains a single bit that is preferably set to "0" to indicate an interlaced format signal and "1" to indicate a progressive format signal. It should be noted, however, that the invention is not limited in this regard, as more than one flag and various bit combinations in each flag may be used for purposes of identifying which format was used to create the recorded video.

In accordance with the inventive arrangements, the preprocessing engine 188 preferably locates and sets the progressive frame flag 34 of each of the repeated frames to indicate that the MPEG video bitstream 30 was created under a progressive scanning format. This process can be started once the preprocessing engine 188 receives an instruction from the control CPU 122. The preprocessing engine 188 preferably begins to search for an extension start code flag 36, typically positioned at the beginning of the picture coding extension header 32. The preprocessing engine 188 searches for the extension start code flag 36 since this flag is easier to locate than the other flags that comprise the picture coding extension header 32. This is because the extension start code flag 36 typically contains thirty-two bits that do not deviate from their initial setting.

After the extension start code flag 36 has been found, the preprocessing engine 188 can locate the progressive frame flag 34 by referencing the start code flag 36. The preprocessing engine 188 can then set the progressive flag to indicate that the repeated frames in the MPEG video bitstream 30 were scanned progressively when in fact these frames were originally scanned under the interlaced format. For purposes of setting the progressive frame flag 34, the frame flag 34 preferably contains a single bit that is preferably set to "1" by the preprocessing engine 188. Altering the MPEG video bitstream 30 in this manner can cause the interlaced fields of each frame to be simultaneously displayed during trick mode playback on an ATSC television thereby eliminating the vibration effect. It should be noted, however, that the invention is not limited in this regard, as more than one flag and various bit combinations in each flag may be used for purposes of altering the MPEG video bitstream 30.

Figure 4:
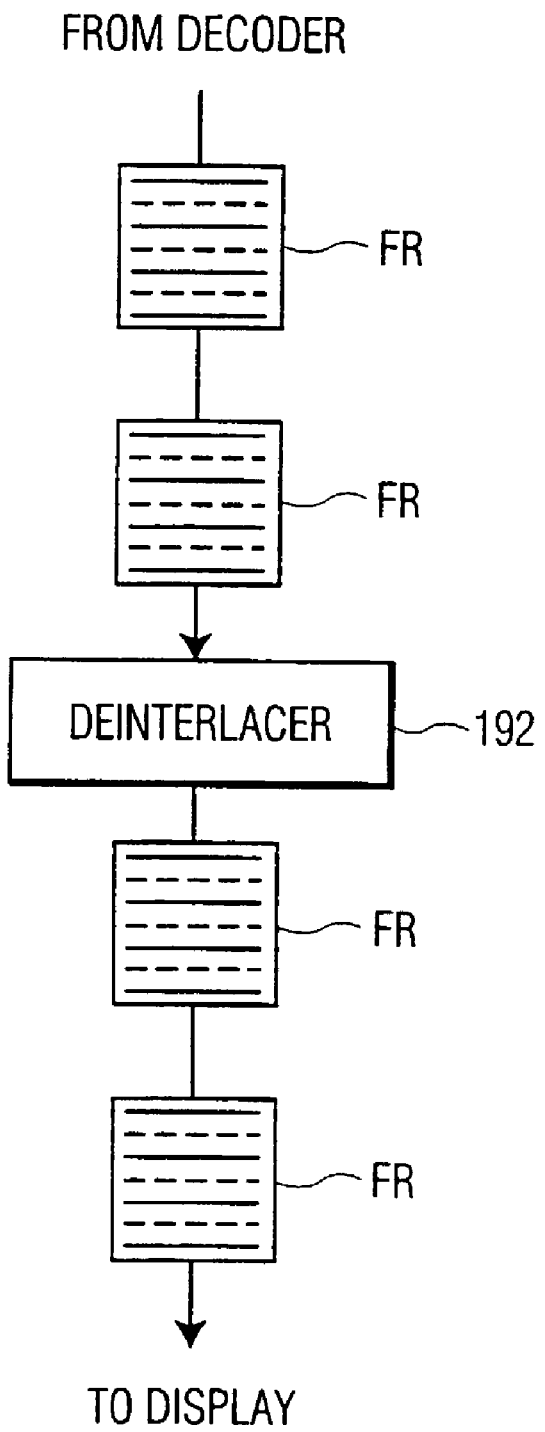
FIG. 4 illustrates the processing of complete frames in a video signal in accordance with the inventive arrangements.

Since the decoder 190 of the display device 186 considers the video signal as a progressive scan signal, the decoder 190 can instruct the deinterlacer 192 to discontinue deinterlacing the interlaced fields that comprise the repeated frames in the video signal being sent from the device 100. As shown in FIG. 4, if the incoming video signal includes a complete frame designated by reference letters FR that is being repeated, the deinterlacer 192 can stop the deinterlacing process and can allow the frame FR to pass through without extracting its interlaced fields. These interlaced fields are shown in FIG. 4 as a series of lines in the frame FR with the solid lines representing one field and the dashed lines representing the other. Accordingly, this frame FR can be kept intact, and the interlaced fields that constitute the particular frame FR being repeated for purposes of trick mode playback can be simultaneously displayed. This simultaneous display of the interlaced fields in the video signal eliminates the vibration effect present in trick mode playback of interlaced video.

Although it may appear that the invention is primarily directed to ATSC televisions that only display progressively scanned frames, the invention is not so limited. The invention can be practiced with ATSC televisions capable of displaying pictures scanned under the progressive scanning format or the interlaced scanning format. One example of such a television is a 1080 line interlaced HDTV.

In an alternative aspect, the invention can be practiced in a video recorder that includes a video decoder system that is capable of decoding and processing video signals containing high bit rates, such as those associated with HDTV televisions. Under this arrangement, the high bit rate signals can be altered and decoded in the video recorder and then sent to a display device for display. This arrangement can also be useful if the high-performance video decoder system is mounted in the video recorder.

The invention claimed is:

1. In a video media device, a method for eliminating picture artifacts comprising the steps of:
   in response to a trick mode command, iteratively transmitting one or more frames in a video signal recorded under an interlaced scanning format, said video signal including a predetermined number of replicate frames associated with said one or more frames;
   only in response to a trick mode command, altering said video signal to indicate said video signal was recorded under a progressive scanning format thereby; and
   stopping deinterlacing of interlaced fields that comprise the replicate frames to allow the interlaced fields that constitute each replicate frame to be simultaneously displayed.

2. The method according to claim 1, wherein said altering step is performed by setting the value of one or more flags in said video signal.

3. The method according to claim 2, wherein said video media device uses an MPEG format to create said video signal, said video signal including an MPEG video bit stream.

4. The method according to claim 3, wherein said one or more flags that are set in said altering step is a progressive frame flag of said MPEG video bit stream.

5. The method according to claim 4, wherein said progressive frame flag includes one or more bits, said one or more bits set in said altering step to indicate that said video signal was recorded under a progressive scanning format.

6. The method according to claim 5, wherein said one or more bits is a single bit, said single bit set in said altering step to a high value.

7. The method according to claim 3, wherein an MPEG decoder for decoding said MPEG video bit stream is mounted in said video media device.

8. The method according to claim 3, wherein an MPEG decoder for decoding said MPEG video bit stream is remotely located.

9. The method according to claim 8, wherein said MPEG decoder is mounted in a display device.

10. The method according to claim 1, wherein said altering step causes one or more pairs of interlaced fields associated with said frames and said replicate frames to be simultaneously displayed on a display device.

11. The method according to claim 10, wherein said display device uses a progressive scanning format to display said video image.

12. The method according to claim 10, wherein said display device is capable of using a progressive scanning format or an interlaced scanning format to display said video image.

13. A video media system for eliminating picture artifacts comprising:
   a video recorder responsive to a trick mode command for iteratively transmitting one or more frames in a video signal recorded under an interlaced scanning format, said video signal including a predetermined number of replicate frames associated with said one or more frames; and
   structure for, only in response to a trick mode command, altering said video signal to indicate said video signal was recorded under a progressive scanning format and stopping deinterlacing of interlaced fields that comprise the replicate frames to allow the interlaced fields that constitute each replicate frame to be simultaneously displayed.

14. The video media system according to claim 13, wherein said structure alters said video signal by setting the value of one or more flags in said video signal.

15. The video media system according to claim 14, wherein said video recorder uses an MPEG format to create said video signal, said video signal including an MPEG video bit stream.

16. The video media system according to claim 15, wherein said one or more flags that are set by said structure is a progressive frame flag of said MPEG video bit stream.

17. The video media system according to claim 16, wherein said progressive frame flag includes one or more bits, said one or more bits set by said structure to indicate that said video signal was recorded under a progressive scanning format.

18. The video media system according to claim 17, wherein said one or more bits is a single bit, said single bit set by said structure to a high value.

19. The video media system according to claim 15, wherein an MPEG decoder for decoding said MPEG video bit stream is mounted in said video recorder.

20. The video media system according to claim 15, wherein an MPEG decoder for decoding said MPEG video bit stream is remotely located.

21. The video media system according to claim 20, wherein said MPEG decoder is mounted in a display device.

22. The video media system according to claim 13, wherein said structure causes one or more pairs of interlaced fields associated with said frames and said replicate frames to be simultaneously displayed on a display device.

23. The video media system according to claim 22, wherein said display device uses a progressive scanning format to display said video image.

24. The video media system according to claim 22, wherein said display device is capable of using a progressive scanning format or an interlaced scanning format to display said video image.

* * * * *